US009176857B2

(12) United States Patent
He

(10) Patent No.: US 9,176,857 B2
(45) Date of Patent: Nov. 3, 2015

(54) METHOD AND APPARATUS FOR MANAGING VIDEO MEMORY IN EMBEDDED DEVICE

(75) Inventor: Hu He, Shanghai (CN)

(73) Assignee: MStar Semiconductor, Inc., Hsinchu Hsien (TW)

( * ) Notice: Subject to any disclaimer, the term of this patent is extended or adjusted under 35 U.S.C. 154(b) by 369 days.

(21) Appl. No.: 13/585,022

(22) Filed: Aug. 14, 2012

(65) Prior Publication Data

US 2013/0061017 A1    Mar. 7, 2013

(30) Foreign Application Priority Data

Sep. 6, 2011    (CN) .......................... 2011 1 0262710

(51) Int. Cl.
*G06F 12/02*    (2006.01)
*G06F 3/06*    (2006.01)
*G06F 9/50*    (2006.01)

(52) U.S. Cl.
CPC ............ *G06F 12/023* (2013.01); *G06F 3/0626* (2013.01); *G06F 3/0644* (2013.01); *G06F 3/0631* (2013.01); *G06F 9/5016* (2013.01)

(58) Field of Classification Search
None
See application file for complete search history.

(56) References Cited

U.S. PATENT DOCUMENTS

| | | | | |
|---|---|---|---|---|
| 5,394,537 A * | 2/1995 | Courts et al. | ................... | 711/202 |
| 5,555,405 A * | 9/1996 | Griesmer et al. | ....................... | 1/1 |
| 5,930,827 A * | 7/1999 | Sturges | .......................... | 711/170 |
| 6,047,280 A * | 4/2000 | Ashby et al. | .................. | 701/431 |
| 6,088,777 A * | 7/2000 | Sorber | .......................... | 711/171 |
| 6,701,420 B1 * | 3/2004 | Hamilton et al. | ............. | 711/170 |
| 2004/0193775 A1 * | 9/2004 | Van Doren et al. | ................ | 711/1 |
| 2006/0259657 A1 * | 11/2006 | Sachs et al. | ....................... | 710/22 |
| 2008/0008202 A1 * | 1/2008 | Terrell et al. | ................... | 370/401 |
| 2010/0030994 A1 * | 2/2010 | Guzman | ........................ | 711/173 |
| 2012/0239851 A1 * | 9/2012 | Calvert et al. | ................. | 711/103 |

FOREIGN PATENT DOCUMENTS

| | | |
|---|---|---|
| CN | 101320351 A | 12/2008 |
| CN | 101673246 A | 3/2010 |

OTHER PUBLICATIONS

State Intellectual Property Office (SIPO) Office Action citing prior issued Mar. 1, 2013, 8 pages.
State Intellectual Property Office (SIPO) Office Action citing prior art issued Aug. 21, 2013, 7 pages.
State Intellectual Property Office (SIPO) Office Action citing prior art issued Dec. 10, 2013, 10 pages.
Taiwan Office Action citing prior art issued Mar. 5, 2014, 9 pages.

* cited by examiner

*Primary Examiner* — Maurice L McDowell, Jr.
*Assistant Examiner* — Donna J Ricks
(74) *Attorney, Agent, or Firm* — Edell, Shapiro & Finnan, LLC

(57) ABSTRACT

A method for managing an image memory in an embedded device is provided. A node is obtained from a linked list of the image memory. It is judged whether valid data is present in a memory block corresponding to the node. When no valid data is present, it is judged whether valid data is present in a memory block corresponding to a previous node of the node. When valid data is present in the previous node, it is further judged whether the valid data is movable. When the valid data is movable, memory block information described in the two nodes is exchanged, and the valid data previously stored in the memory block corresponding to the previous node is moved to the memory block corresponding to the node.

10 Claims, 5 Drawing Sheets

METHOD AND APPARATUS FOR MANAGING VIDEO MEMORY IN EMBEDDED DEVICE

This application claims the benefit of People's Republic of China Patent Application Serial No. 201110262710.8, filed Sep. 6, 2011, the subject matter of which is incorporated herein by reference.

BACKGROUND OF THE INVENTION

1. Field of the Invention

The invention relates in general to a calculator, and more particularly to a method and apparatus for managing an image memory in an embedded device.

2. Description of the Related Art

Direct Frame Buffer (DirectFB) is a prevalent software library implemented in embedded systems. Tailored for special requirement environments of embedded devices, DirectFB is a compact, powerful and easy-to-use technique for graphic acceleration and graphic reinforcement. Functions of DirectFB manage an image memory by use of a linked list. In an initial state, the linked list only includes one free memory node for recording a start address and an end address of an entire memory pool. When an application program needs to be allotted with a memory block from the memory pool, a DirectFB memory management unit traverses all free memory nodes in the linked list, and identifies and allots a most matching free memory node to the application program. In the event that no matching free memory node having an appropriate size is found, a free memory node having a closest size is allotted, a new memory node is inserted into the linked list to record information of the newly allotted memory block, and the new memory node is then marked as having been allotted. Memory blocks described in neighboring memory nodes in the linked list are also physically neighboring.

In current DirectFB techniques for managing the memory, when an application program releases a memory block, a node recording information of the memory block is set to free. When a neighboring node of the free node is also free, the two nodes are merged such that the free memory blocks recorded by the two nodes are merged into a larger free memory block, as indicated by a block block4 merged from the block block4 and a block block5 in FIG. 1. With the above memory management technology, memory fragments result if the physically continuous memory blocks have different lifespans. Thus, although a total amount of the free memory is greater than the size of the required memory, it is possible that all the free nodes are smaller than the size of the required memory to cause a memory allotment failure during the memory management.

Therefore, there is a need for a solution for ensuring an application program is allotted with a required memory under a situation that a free memory is greater than the required memory.

SUMMARY OF THE INVENTION

The disclosure is directed to a method and apparatus for managing an image memory in an embedded device. Under a situation that a total free memory is greater than a required memory and an independent free memory block is smaller than the required memory, the method and apparatus of the disclosure significantly increases the probability that an application program is successfully allotted with the required memory.

Therefore, according to an aspect of the disclosure, a method for managing an image memory in an embedded system is provided. The method includes steps of: obtaining a node from a linked list of the image memory; judging whether valid data is present in a memory block corresponding to the node; when no valid data is present in the memory block corresponding to the node, judging whether valid data is present in a memory block corresponding to a previous node of the node; when valid data is present in the memory block corresponding to the previous node, judging whether the valid data is movable; when the valid data stored in the memory block corresponding to the previous node is movable, exchanging memory block information described in the node with memory block information described in the previous node, and moving the valid data previously stored in the memory block corresponding to the previous node to the memory block corresponding to the node.

According to another aspect of the disclosure, an apparatus for managing an image memory in an embedded device is provided. The apparatus includes: a first obtaining module, for obtaining a node from a linked list of the image memory; a first judging module, for judging whether valid data is present in a memory block corresponding to the node obtained by the obtaining module; a second judging module, when the first judging module judges valid data is not present in the memory block corresponding to the node obtained by the first obtaining module, for judging whether valid data is present in a memory block corresponding to a previous node of the node; a third judging module, when the second judging module judges valid data is present in the memory block corresponding to the previous node, for judging whether the valid data is movable; and an exchange module, when the third judging module judges the valid data in the memory block corresponding to the previous node is movable, for exchanging memory block information described in the node with memory block information described in the previous node, and moving the valid data stored in the memory block corresponding to the previous node to the memory block corresponding to the node.

Through the nodes obtained from the linked list of the image memory according to the disclosure, when it is detected that the valid data stored in the memory block corresponding to a non-free node is movable, the memory block information in the free node is exchanged with the memory block information in the non-free node. Accordingly, the free node is moved towards a start direction of the linked list and the non-free node is moved towards an end direction of the linked list, such that the moved free memory blocks are located at a start position of the image memory. Therefore, by managing the memory fragments of the image memory, a plurality of memory fragments are moved to the start position to form a large and physically continuous free memory block, which is able to fulfill a memory request when an application program needs a larger memory block.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
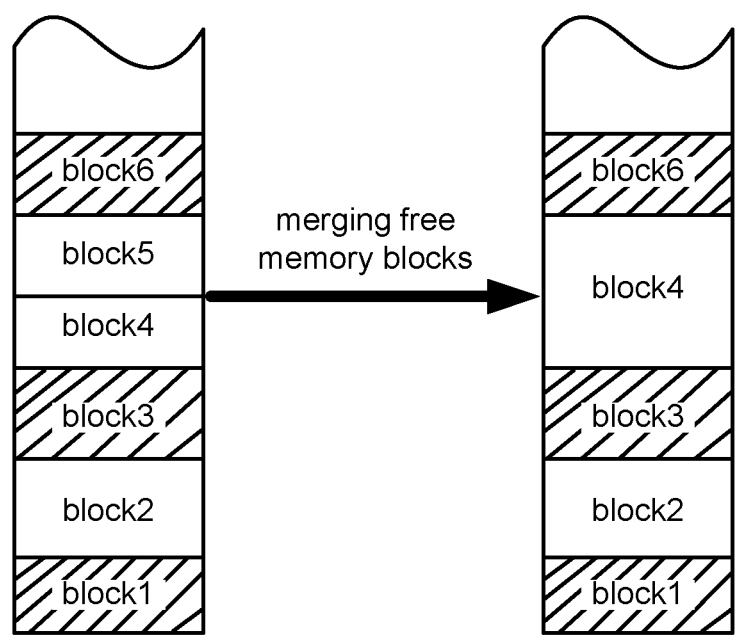
FIG. 1 is a schematic diagram of merging neighboring free memory blocks in the prior art.
Figure 2:
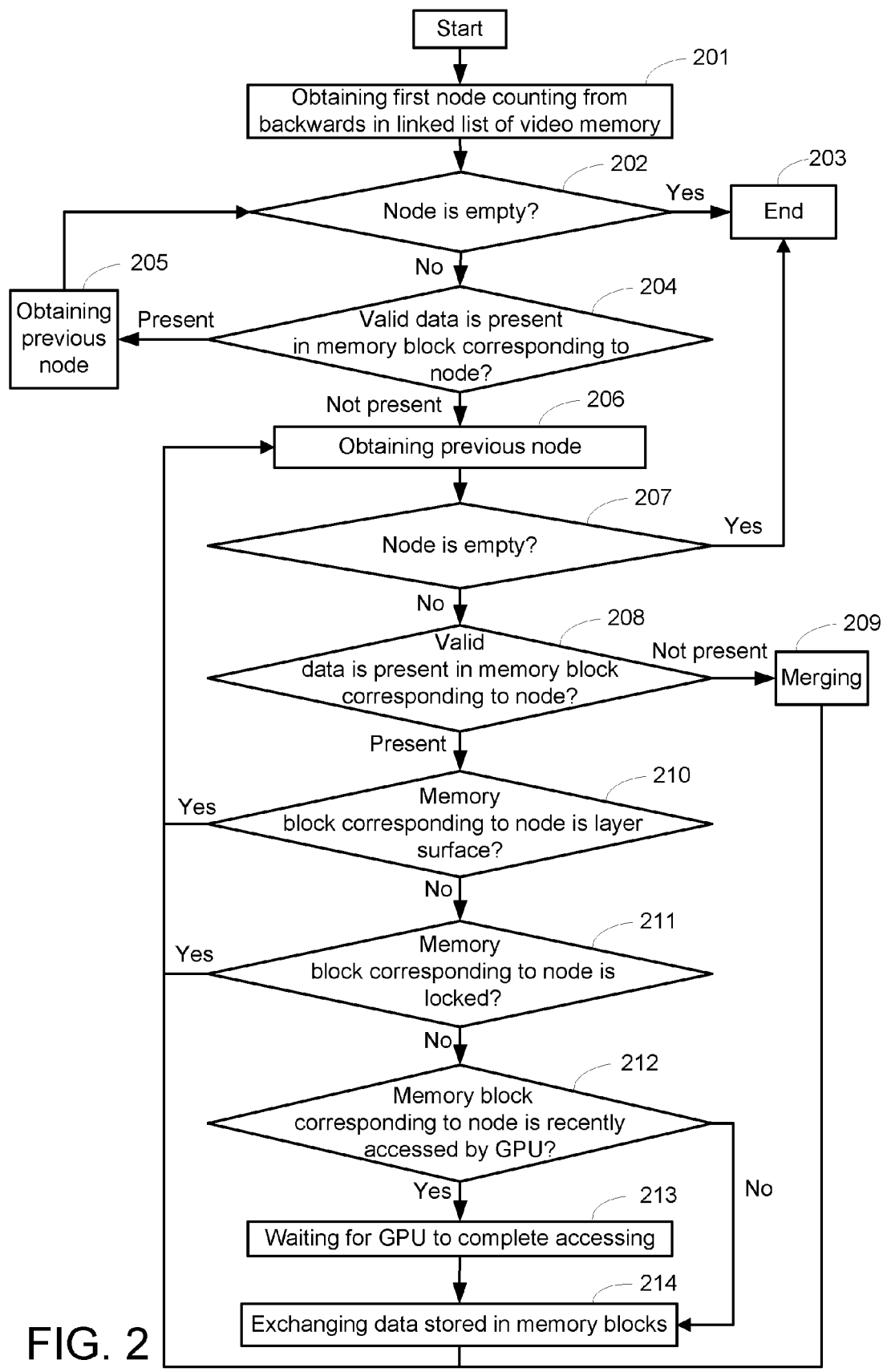
FIG. 2 is a flowchart of a method for managing an image memory according to one embodiment of the disclosure.

FIG. 2 shows a flowchart of a method for managing an image memory in an embedded device according to one embodiment of the disclosure. The method includes the following steps.

In Step 201, a first node counting from backwards in a linked list is obtained from an image memory. Nodes are obtained from the first node counting from backwards in the linked list of the image memory, starting by obtaining the first node counting from backward.

In Step 202, it is judged whether the node is empty. Each time a node is obtained, it is judged whether the obtained node is empty. When the obtained node is empty, it infers that the previous node obtained is a last node in the linked list of the image memory. Step 203 is performed when the node is empty, or else Step 204 is performed when the node is not empty.

In Step 203, the process ends. When it is judged in Step 202 that the node is empty, it means that the entire linked list of the image memory is managed, and so the process ends.

In Step 204, it is judged whether valid data is present a memory block corresponding to the node. Step 205 is performed when valid data is present, or else Step 206 is performed.

In Step 205, a previous node is obtained. When it is judged in Step 204 that valid data is present in the memory block corresponding to the node, Step 202 is iterated to judge whether the node obtained in this step is empty. When the node obtained in this step is not empty, Step 204 is repeatedly iterated to judge whether valid data is present in a memory block corresponding to the node obtained in the step, until a node without valid data in the corresponding memory block is reached, as in Step 206.

In Step 206, a previous node is obtained. When it is judged in Step 204 that valid data is not present in the memory block corresponding to the node, the previous node of the node is obtained.

In Step 207, it is judged whether the previous node is empty. It is judged whether the previous node obtained in Step 206 is an empty node. When the previous node is an empty node, it infers that the previous node obtained is the last node in the linked list of the image memory. Step 203 is performed when the node is empty to end the process, or else Step 208 is performed when the node is not empty.

In Step 208, it is judged whether valid data is present the memory block corresponding to the previous node. Step 210 is performed when valid data is present, or else Step 209 is performed when no valid data is present.

In Step 209, a merging step is performed. The node obtained in Step 201 or the node obtained in Step 205 is merged with the node obtained in Step 206. More specifically, a start address of the node obtained in Step 201 or the node obtained in Step 205 is changed to a start address of the node obtained in Step 206, a pointer of the node obtained in Step 201 or the node obtained in Step 205 pointing to the previous node is changed to point to a previous node of the node obtained in Step 206, and the node obtained in Step 206 is deleted.

Alternatively, in the merging step, an end address of the node obtained in Step 206 is changed to an end address of the node obtained in Step 201 or the node obtained in Step 205, and a pointer of the node obtained in Step 206 pointing to a next node is changed to point to a next node of the node obtained in Step 201 or the node obtained in Step 205, and the node obtained in Step 201 or the node obtained in Step 205 is deleted.

In Step 210, it is judged whether the memory block corresponding to the node obtained in Step 206 is a layer surface. When the memory block corresponding to the node obtained in Step 206 is the layer surface, it means that the valid data stored in the memory block corresponding to the node is immovable, and Step 206 is iterated to obtain the previous node. When it is judged the memory block corresponding to the node obtained in Step 206 is not the layer surface, it means the valid data stored in the memory block is movable, and Step 211 is performed.

In Step 211, it is judged whether the memory block corresponding to the node is locked. The memory block is locked when the memory block is in use, and the valid data stored in the memory block is immovable. When it is judged the memory block corresponding to the node obtained in Step 206 is locked, Step 206 is iterated to obtain the previous node. When it is judged the memory block corresponding to the node obtained in Step 206 is not locked, it means the valid data stored in the memory block corresponding to the node is movable, and Step 212 is performed.

In Step 212, it is judged whether the memory block corresponding to the node is recently accessed by a graphic process unit (GPU). When the memory block is recently accessed by the GPU, it is possible that the GPU is currently using the data stored in the memory block, and so the valid data stored in the memory block is temporarily immovable and can only be moved after the GPU completes accessing. Therefore, it is judged whether the memory block corresponding to the node obtained in Step 206 is recently accessed by the GPU. Step 213 is performed when the memory block corresponding to the node obtained in Step 206 is recently accessed by the GPU, or else Step 214 is performed when the memory block corresponding to the node obtained in Step 206 is not recently accessed by the GPU.

In Step 213, the process waits until the GPU completes accessing. When it is judged that the memory block corresponding to the node obtained in Step 206 is recently accessed by the GPU, the process waits until the GPU completes accessing.

In Step 214, data stored in the memory blocks is exchanged. When it is judged that the valid data stored in the memory block corresponding to the node obtained in Step 206 is movable, memory block information described in the node obtained in Step 206 is exchanged with memory block information described in the node obtained in Step 201 or the node obtained in Step 205, and the valid data stored in the memory block corresponding to the node obtained in Step 206 is moved to the memory block corresponding to the node obtained in Step 201 or the node obtained in Step 205.

After completing the step of exchanging the data stored in the memory blocks, Step 206 is repeatedly iterated to obtain the previous node until it is judged that the obtained node is an empty node, i.e., all the memory blocks containing no valid data are moved to a front part of the image memory.

It should be noted that, in other embodiments, an order of Steps 210 and 211 may be exchanged. That is, Step 211 may be performed before Step 210.

Figure 3:
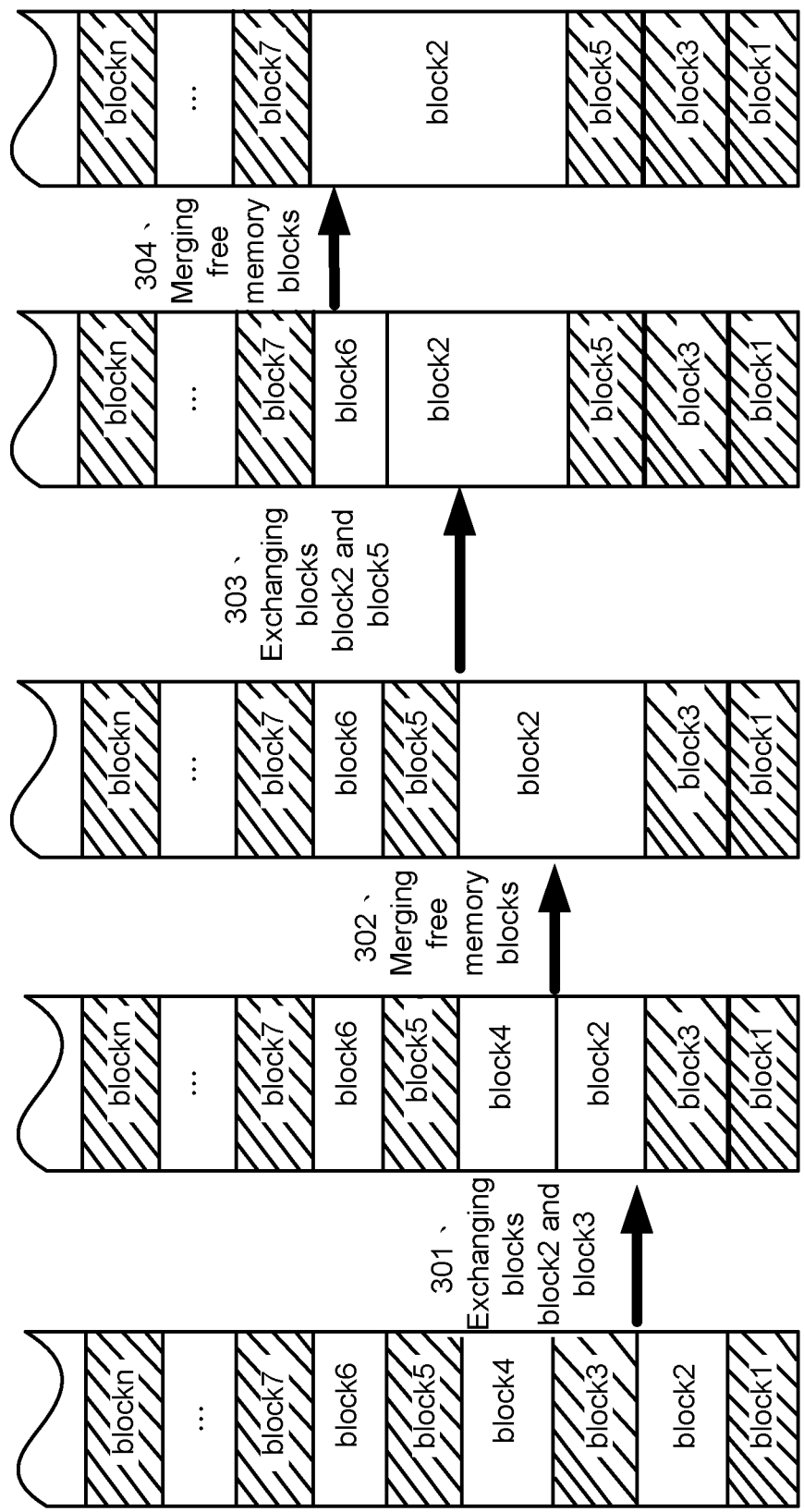
FIG. 3 is a schematic diagram of a method for managing an image memory according to one embodiment of the disclosure.

Assume an image memory is divided into n memory blocks block1 to blockn. The image memory is managed by a corresponding linked list. In the linked list, each node corresponds to a memory block, i.e., the blocks block1 to blockn respectively correspond to a first node to an $n^{th}$ node, as shown in FIG. 3.

More specifically, a node is obtained starting from a last node of the linked list. Each time a node is obtained, it is judged whether the obtained node is empty to confirm whether all the nodes in the linked list are obtained. For example, the last node, i.e., the first node, is first obtained. The first node corresponds to the block block1, which contains valid data. A next node, i.e., the second node, is obtained. The second node corresponds to the block block2, which contains no valid data, indicating that the block block2 is free. The third node corresponding to the block block3 is then obtained. The block block3 contains valid data. It is judged whether the valid data in the block block3 is movable. When it is judged that the block block3 is not a layer surface, is not locked, and is not recently accessed by the GPU, it means the valid data in the block block3 is movable. Hence, the valid data in the block block3 is moved to the block block2. More specifically, the memory block information described in the third node and the memory block information described in the second node is exchanged, and the valid data in the block block3 is moved to the block block2, as shown in 301 in FIG. 3.

A next node, i.e., the fourth node, is obtained. The fourth node is not empty, and it is judged valid data is not present in the block block4 corresponding to the fourth node. Therefore, the second node and the fourth node are merged as the second node. More specifically, a start address of the second node is changed to a start address of the fourth node, and a previous node of the second node is changed to a previous node of the fourth node. That is, the previous node of the second node is changed to the fifth node, and the fourth node is deleted, as shown in 302 in FIG. 3.

A next node, i.e., the fifth node, is obtained. The fifth node is not empty, and it is judged valid data is present in the block block5 corresponding to the fifth node. It is then judged whether the valid data stored in the block block5 is movable. More specifically, when it is judged that the block block5 is not a layer surface and is not locked, but is recently accessed by the GPU, the valid data stored in the block block5 can only be moved after the GPU completes accessing. When the GPU completes accessing, the valid data stored in the block block5 is moved to the block block2. More specifically, the memory block information described in the fifth node is exchanged with the memory block information described in the second node, and the valid data stored in the block block5 is moved to the block block2, as shown in 303 in FIG. 3.

A next node, i.e., the sixth node, is obtained. The sixth node is not empty, and it is judged valid data is not present in the block block6 corresponding to the sixth node. Therefore, the second node and the sixth node are merged as the second node. More specifically, a starting address of the second node is changed to a starting address of the sixth node, and the previous node of the second node is changed to a previous node of the sixth node. That is, the previous node of the second node is changed to the seventh node, and the sixth node is deleted, as shown in 304 in FIG. 3.

The above process is repeatedly performed until the last node counting from backwards in the linked list is processed. That is, when an obtained node is an empty node, it means the last node counting from backwards in the linked list is processed, and thus the process ends.

In this embodiment, by traversing the nodes in the linked list of the image memory from the end forwards to the start, when it is detected that the valid data stored in the memory block corresponding to a non-free node is movable, the memory block information described in the free node is exchanged with the memory block information described in the non-free node, and the valid data stored in the memory block corresponding to the non-free node is moved to the memory block corresponding to the free node. Accordingly, the free node is moved towards the start direction of the linked list and the non-free node is moved towards the end direction of the linked list, such that the merged free memory blocks are located at a start position of the image memory. Therefore, by managing the memory fragments of the image memory, a plurality of memory fragments are moved to the start position to form a large and physically continuous free memory block, which is able to fulfill a memory request when an application program needs a larger memory block.

Figure 4:
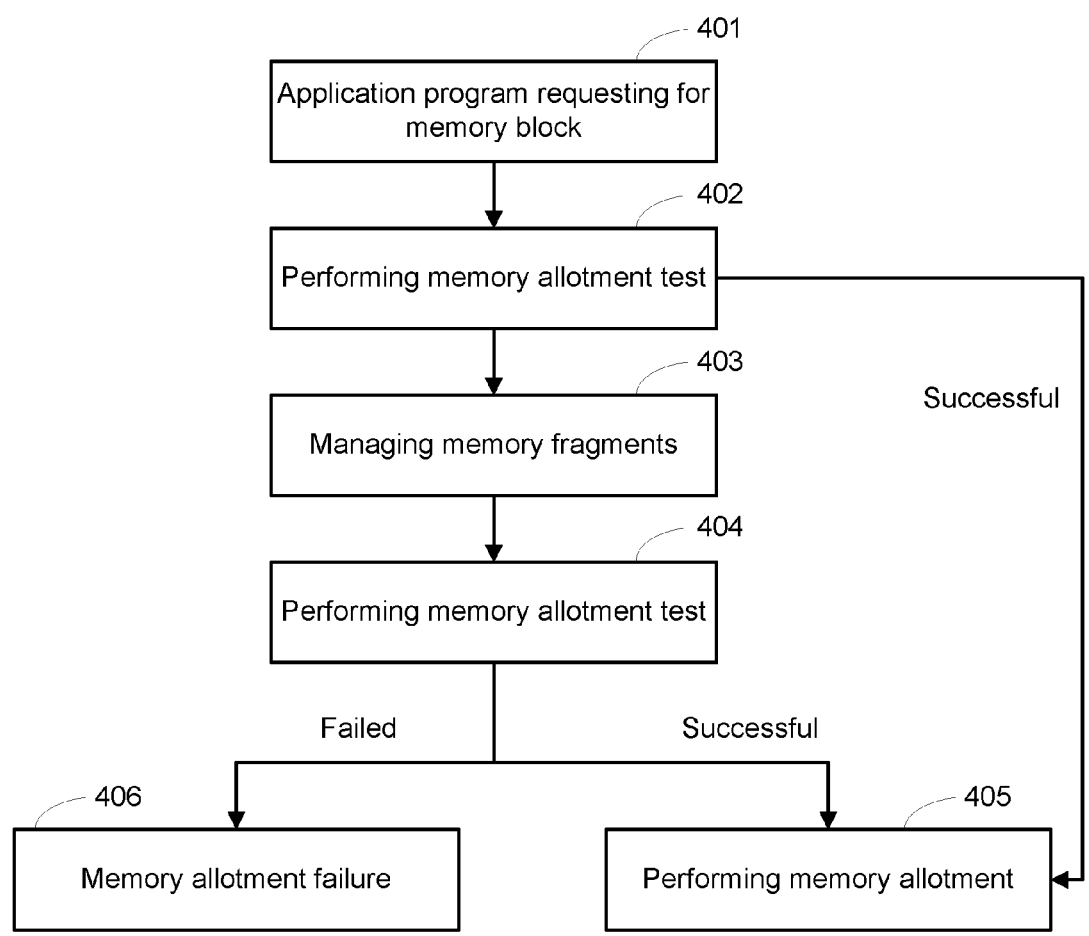
FIG. 4 is a flowchart of a method for managing an image memory in an actual application according to one embodiment of the disclosure.

When an application program requests for memory, in the event that no memory block having an appropriate size is available for fulfilling the request of the application program, the memory fragments need to be managed according to the method according to the above embodiment. The process for managing the memory fragments is to be described below with reference to FIG. 4.

In Step 401, the application program requests for a memory block.

In Step 402, a memory allotment test is performed. Upon receiving the memory block request from the application program, DirectFB first performs a memory allotment test on the request. That is, it is tested whether the size of currently free memory blocks satisfies the request of the application program. When the size of the currently free memory blocks satisfies the request of the application program, Step 405 is performed, or else Step 403 is performed when the size of currently free memory blocks fails to satisfy the request of the application program.

In Step 403, the memory fragments are managed. Details of the management on the fragments of the image memory by DirectFB are as described in the method for managing DirectFB memory according to the above embodiment, and shall be omitted therein. After managing the fragments of the image memory, Step 404 is performed.

In Step 404, a memory allotment test is performed. After managing the fragments of the image memory in Step 403, a memory allotment test is again performed. When the size of the merged free memory block satisfies the requirement of the application program, Step 405 is performed, or else Step 406 is performed when the size of the merged free memory block fails to satisfy the requirement of the application program.

In Step 405, memory allotment is performed. Memory allotment is performed when the memory allotment test is successful.

In Step 406, the memory allotment fails. When the memory allotment fails, information of insufficient memory is fed back to the application program.

Regarding the presence of memory fragments, the number of memory fragments grows as a utilization period gets longer and a probability that the failure of an application program requests for a memory gets larger, such that an application execution may be interrupted. Through the method according to the disclosure, instead of immediately returning to failed information after the memory allotment test is failed for the first time, the memory fragments are managed. Only when the size of the managed memory block still fails to satisfy the need of the application program, the process returns to the information of insufficient memory. Therefore, the method of allocating memory according to the embodiment significantly increases the probability that an application program is successfully allotted with an appropriate memory.

Figure 5:
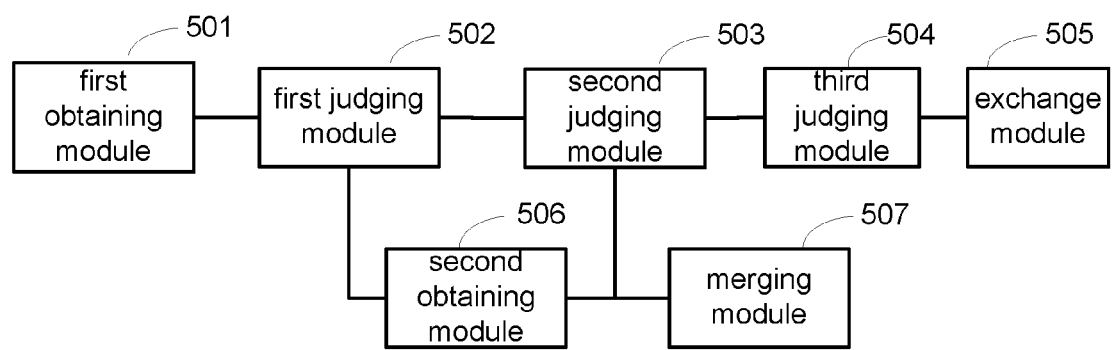
FIG. 5 is a schematic diagram of a logic structure of an apparatus for managing an image memory according to one embodiment of the disclosure.

FIG. 5 shows a schematic diagram of a logic structure of an apparatus for managing an image memory in an embedded device. The apparatus includes: a first obtaining module 501, for a obtaining node from the image memory; a first judging module 502, for judging whether valid data is present in a memory block corresponding to a node obtained by the first obtaining module 501; a second judging module 503, when the first judging module 502 judges no valid data is present in the memory block corresponding to the node obtained by the first obtaining module 501, for judging whether valid data is present in a memory block corresponding to a previous node of the node; a third judging module 504, when the second judging module 503 judges valid data is present in the memory block corresponding to the previous node, for judging whether the valid data is movable; and an exchange module 505, when the third judging module 504 judges the valid data stored in the memory block corresponding to the previous node is movable, for exchanging memory block information described in the node with memory block information described in the previous node, and moving the valid data stored in the memory block corresponding to the previous node to the memory block corresponding to the node.

In an alternative embodiment, the apparatus further includes a second obtaining module 506. When the first judging module 502 judges valid data is present in the memory block corresponding to the node, the second obtaining module 506 obtains the previous node of the node, and the second judging module 503 judges whether valid data is present in the memory block corresponding to the previous node until the first node of the linked list of the image memory is obtained.

When the first judging module 502 judges no valid data is present in the memory block corresponding to the node, the second judging module 503 judges valid data is present in the memory block corresponding to the previous node, and the third judging module 504 judges the valid data stored in the memory block corresponding to the previous node is not movable, the second obtaining module 506 further obtains a previous node of the previous node. The second judging module 503 then judges whether valid data is present in the memory block corresponding to the obtained node (the previous node of the previous node) until the first node in the linked list of the image memory is obtained.

The third judging module 504 includes a first judging unit, a second judging unit and a third judging unit.

The first judging unit judges whether the memory block corresponding to the previous node of the obtained node is the layer surface. The valid data stored in the memory block corresponding to the previous node is immovable when the memory block corresponding to the previous node is the layer surface.

The second judging unit judges whether the memory block corresponding to the previous node is locked when the first judging unit judges the memory block corresponding to the previous node is not the layer surface. When the memory block corresponding to the previous node is locked, it means that the valid data stored in the memory block corresponding to the previous node is immovable.

The third judging unit judges whether the memory block corresponding to the previous node is recently accessed by a GPU when the first judging module judges the memory block corresponding to the previous node is not the layer surface and the second judging module judges the memory block corresponding to the previous node is not locked. When the memory block corresponding to the previous node is recently accessed by the GPU, the valid data stored in the memory block corresponding to the previous node can only be moved after the GPU completes accessing.

The apparatus according to this embodiment further includes a merging module 507. When the second judging unit module 503 judges no valid data is present in the previous node of the obtained node, the merging module 507 merges the node with the previous node.

More specifically, the merging module 507 includes a merging unit and a deleting unit. The merging unit changes a starting address of the node to a starting address of the previous node, and changes a pointer of the node pointing to pointing to the previous node to the previous node of the previous node. The merging unit further changes an end address of the previous node to an end address of the node, and changes the pointer of the previous node pointing to a next node to pointing to a next node of the node. The deleting unit deletes the node.

In this embodiment, by traversing the nodes in the linked list of the image memory from the end forwards to the start, when it is detected that the valid data stored in the memory block corresponding to a non-free node is movable, the memory block information described in the free node is exchanged with the memory block information described in the non-free node, and the valid data stored in the memory block corresponding to the non-free node is moved to the memory block corresponding to the free node. Accordingly, the free node is moved towards the start direction of the linked list and the non-free node is moved towards the end direction of the linked list, such that the merged free memory blocks are located at a start position of the image memory. Therefore, by managing the memory fragments of the image memory, a plurality of memory fragments are moved to the start position to form a large and physically continuous free memory block, which is able to fulfill a memory request when an application program needs a larger memory block.

Details of the method and apparatus for managing an image memory in an embedded device in the above embodiments are described on the basis of the DirectFB technique. However, it should be noted that the disclosure is not limited to the DirectFB technique but is also suitable for other techniques implemented for managing an image memory in an embedded system.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for managing an image memory in an embedded device, comprising:
   obtaining a node from a linked list of the image memory;
   judging whether valid data is present in a memory block corresponding to the node in the image memory;
   judging whether valid data is present in a memory block corresponding to a previous node in the image memory when no valid data is present in the memory block corresponding to the node;
   judging whether the valid data is movable when valid data is present in the memory block corresponding to the previous node;

when the valid data stored in the memory block corresponding to the previous node is movable, exchanging memory block information in the node with memory block information in the previous node, and moving the valid data stored in the memory block corresponding to the previous node to the memory block corresponding to the node, after the step of judging whether valid data is present in the memory block corresponding to the node, the method further comprising, when valid data is present in the memory block corresponding to the node, obtaining a previous node of the node and performing the step of judging whether valid data is present in the memory block corresponding to the previous node until a first node in the linked list of the image memory is obtained; and after the step of judging whether the valid data stored in the memory block corresponding to the previous node is movable, the method further comprising, when it is judged the valid data stored in the memory block corresponding to the previous node is immovable, obtaining a previous node of the previous node and performing the step of judging whether valid data is present in the memo T block corresponding to the obtained node until the first node in the linked list of the image memory is obtained, wherein the step of judging whether the valid data stored in the memory block corresponding to the previous node is movable comprises judging whether the memory block corresponding to the previous node is a layer surface; wherein when the memory block corresponding to the previous node is the layer surface, the valid data stored in the memory block corresponding to the previous node is immovable; and when the memory block corresponding to the previous node is not the layer surface, judging whether the memory block corresponding to the previous node is locked; wherein, when the memory block corresponding to the previous node is locked, the valid data stored in the memory block corresponding to the previous node is immovable.

2. The method according to claim 1, wherein the step of obtaining the node from the linked list of the image memory comprises:

obtaining the node from a first node counting from backwards in the linked list of the image memory.

3. The method according to claim 1, further comprising:

when the memory block corresponding to the previous node is not locked, judging whether the memory block corresponding to the previous node is recently accessed by a graphic processing unit (GPU);

when the memory block corresponding to the previous node is recently accessed by the GPU, waiting for the GPU to complete accessing, and performing the step of exchanging the memory block information described in the node and the memory block information described in the previous node and moving the valid data stored in the memory block corresponding to the previous node to the memory block corresponding to the node.

4. The method according to claim 3, after the step of judging whether valid data is present in the previous node, further comprising:

merging the node with the previous node when no valid data is present in the previous node.

5. The method according to claim 4, wherein the step of merging the node with the previous node comprises:

changing a starting address of the node to a starting address of the previous node, changing a pointer of the node pointing to the previous node to pointing to a previous node of the previous node, and deleting the node.

6. The method according to claim 4, wherein the step of merging the node with the previous node comprises:

changing an end address of the previous node to an end address of the node, changing a pointer of the previous node pointing to a next node to pointing to a next node of the node, and deleting the node.

7. An apparatus for managing an image memory in an embedded device, comprising:

a first obtaining module, for obtaining a node from a linked list of the image memory;

a first judging module, for judging whether valid data is present in a memory block corresponding to the node obtained by the first obtaining module;

a second judging module, for judging whether valid data is present in a memory block corresponding to a previous node when no valid data is present in the memory block corresponding to the node obtained by the first obtaining module;

a third judging module, for judging whether the valid data is movable when valid data is present in the memory block corresponding to the previous node; and an exchange module, when the valid data stored in the memory block corresponding to the previous node is movable, for exchanging memory block information in the node with memory block information in the previous node, and moving the valid data stored in the memory block corresponding to the previous node to the memory block corresponding to the node;

a second obtaining module, when the first judging module judges valid data is present in the memory block corresponding to the node, for obtaining the previous node of the node;

wherein the second judging module judges whether valid data is present in the memory block corresponding to the previous node until a first node of the linked list is obtained, wherein when the first judging module judges no valid data is present in the memory block corresponding to the node, the second judging module judges valid data is present in the memory block corresponding to the previous node and the third judging module judges the valid data stored in the memory block corresponding to the previous node is immovable, the second obtaining module obtains a previous node of the previous node; and the second judging module judges whether valid data is present in the memory block corresponding to the obtained node until the first node of the linked list is obtained, wherein the third judging module comprises:

a first judging unit, for judging whether the memory block corresponding to the previous node of the obtained node is a layer surface; wherein the valid data stored in the memory block corresponding to the previous node is immovable when the memory block corresponding to the previous node is the layer surface;

a second judging unit, for judging whether the memory block corresponding to the previous node is locked when the first judging unit judges the memory block corresponding to the previous node is not the layer surface; wherein when the memory block corresponding to the previous node is locked, the valid data stored in the memory block corresponding to the previous node is immovable; and a third judging unit, for judging whether the memory block corresponding to the previous node is recently accessed by a GPU when the first judging module judges the memory block corresponding to the previous node is not the layer surface and the second judging module judges the memory block corresponding to the previous node is not locked; wherein when the memory block corresponding to the previous node is recently accessed by the GPU, the valid data stored in the memory block corresponding to the previous node is only moved after the GPU completes accessing.

8. The apparatus according to claim 7, further comprising:
a merging module, for merging the node with the previous node when the second judging module judges no valid data is present in the previous node.

9. The apparatus according to claim 8, wherein the merging module comprises:
a merging unit, for changing a starting address of the node to a starting address of the previous node, and changing a pointer of the node pointing to the previous node to pointing to a previous node of the previous node; and
a deleting unit, for deleting the node.

10. The apparatus according to claim 9, wherein the merging unit further changes an end address of the previous node to an end address of the node, and changes the pointer of the previous node pointing to a next node to pointing to a next node of the node.

* * * * *